Aug. 24, 1943.   F. J. O'BRIEN   2,327,447
SELF-HEATING FOOD CONTAINER
Filed Feb. 15, 1940
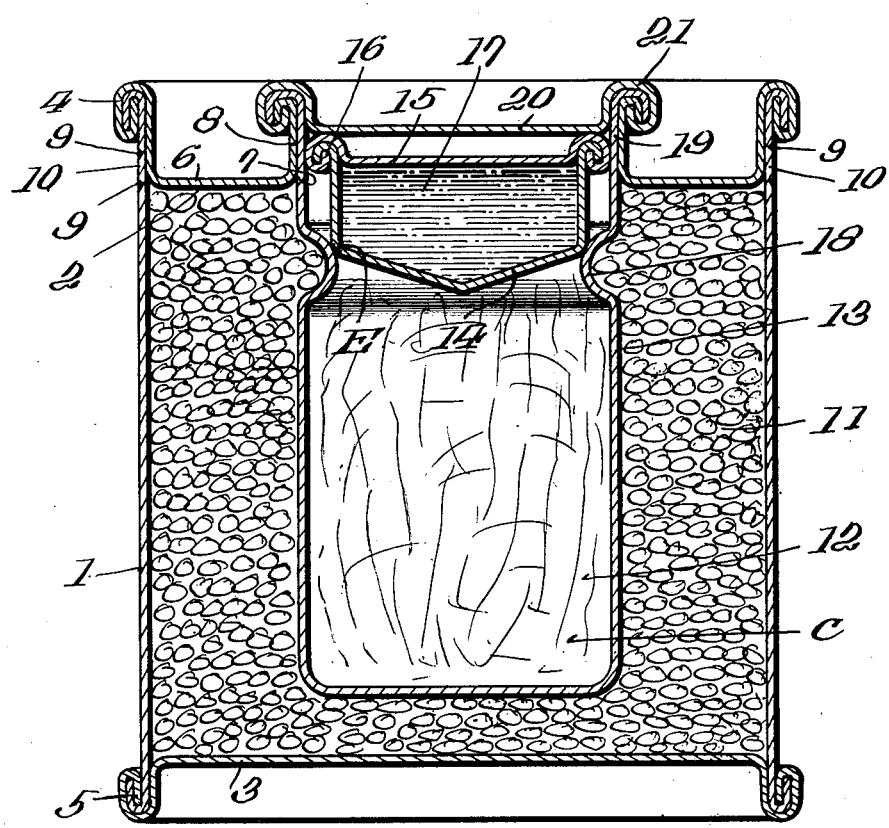
INVENTOR
Frank J. O'Brien
By Mason & Porter
ATTORNEYS Patented Aug. 24, 1943

2,327,447

UNITED STATES PATENT OFFICE 2,327,447

SELF-HEATING FOOD CONTAINER

Frank J. O'Brien, Pelham, N. Y., assignor to Continental Can Company Inc., New York, N. Y., a corporation of New York Application February 15, 1940, Serial No. 319,161

1 Claim. (Cl. 220—20)

The invention relates to a self-heating food package and has for an object to provide a package which is formed of sheet metal and is simple in construction and of few parts wherein the parts are joined to each other by seaming.

A further object of the invention is to provide a container of the above type wherein there is assembled a container for food products and a container for a heating unit, the heating unit being located centrally of the food container and internally thereof in spaced relation to the side and end walls of the food container, for contacting a suitable area of the food within for quickly and evenly heating the same.

A still further object of the invention is to provide a self-heating food container wherein the heating unit is permanently attached centrally to an end of the food container, said end being removably secured to the food container by a rip strip whereby the heating unit may be removed intact when the end is released and used for further heating purposes if so desired.

These and other objects will in part be obvious and will in part be hereinafter more fully disclosed.

Referring to the drawing:

The figure is a sectional view taken through a self-heating food container as disclosed by this invention.

The invention relates broadly to a self-heating food package and comprises an outer container for food having ends seamed thereto. There is also an inner heating unit provided, having compartments adapted to contain substances which produce heat when brought together. One of the ends of the food container has a central opening therein and an upstanding wall surrounding said opening. The heating unit comprises a body portion for holding a suitable dry chemical. The heating unit fits within the opening in the container end and extends inwardly in spaced relation to the side and end wall of the food container. Supported in the upper end of the container for the chemical is a small closed container for a suitable liquid. There is also provided a cover for the heating unit and said cover, the upper portion of the body wall of the heating unit, and the raised portion of the end are rolled into a seam for closing the heating unit and securing the same to the food container. The food container has score lines in the body wall thereof adjacent the end supporting the heating unit, setting off a rip strip which may be torn loose for removing the end with the heating unit attached thereto from the food container.

Referring more in detail to the drawing, the self-heating food container shown therein consists of an outer food container having a sheet metal body portion 1, and ends 2 and 3 joined thereto by conventional double seams as indicated at 4 and 5 in the drawing. The end 2 is shaped so as to form a central depressed portion 6 and is provided with a central opening 7 with an upstanding wall 8 surrounding said opening. The outer wall of the food container is scored as indicated at 9, setting off a rip strip 10 which may be removed by a key or any other suitable means for detaching the end 2 from the container.

The food within the food container is more or less diagrammatically indicated as 11 in the drawing, and a heating unit 12 is provided for heating the same. The heating unit 12 comprises a metallic receptacle having a body portion 13 which is adapted to fit within the opening 7 in the end 2 of the food container. This body portion 13 extends into the food container and is centrally located thereof and is adapted to lie in spaced relation with the side wall 1 and the end wall 3 of the food container whereby the food surrounding and contacting therewith may be evenly and quickly heated. A container for a liquid 14, closed by a cover 15 secured by a seam 16 and containing a suitable fluid as indicated by 17 in the drawing, is placed within the heating unit 12. The body wall 13 of the heating unit is provided with an internal circumferential bead 18 which is adapted to frictionally engage the end portion E of the fluid container, limit its downward movement into the heating unit, and fixedly support it in the upper end thereof. The heating unit 12 is filled with a chemical C as indicated in the drawing, and when the fluid container 14 is in engagement with the bead 18 it acts as a closure for the portion of the heating unit containing the chemical. The upper portion 19 of the heating unit 12 is provided with a cover 20 for closing the same, and this upper portion 19, the upstanding wall 8, and the cover 20 are rolled together into a seam 21 for permanently attaching the heating unit to the cover 2.

It will be noted in the drawing that the seam 21 for joining the heating unit to the end 2 of the food container lies substantially in a plane containing the seam 4 which secures said end to the food container. This provision is made so that containers may be readily stacked for shipment.

When it is desired to heat the food in the food container, a nail or some other sharp instrument is driven through the cover 2 of the heating unit, the cover 15 of the liquid container, and the bottom wall thereof, and immediately removed, whereby the liquid will seep downwardly into the chemical causing heat to be generated which is imparted to the food surrounding the same. By removing the nail or other sharp instrument which has been utilized in puncturing the three thicknesses of metal, a natural vent, not shown, will be afforded for the gases released as chemical action takes place in the heating unit.

When the contents of the container have been sufficiently heated for consumption, the rip strip 10 is removed from the food container and the heating unit 12, together with the cover 2, may be bodily removed from the presence of the food. If so desired, the heating unit may be washed off and placed in a pot of coffee or the like for heating the same.

In manufacture of such a self-heating food container as described above, it is the usual practice to first assemble the separate parts of the heating unit and seam them to the cover 2, which cover is in turn seamed to the body wall 1 of the food container before the bottom end 3 is assembled thereto. The container is then shipped to the packer of the food and filled with food through the open bottom and the end 3 seamed thereto. In this manner the proper amount of food may be readily filled around the heating unit.

It is obvious that minor details of construction might be made without departing from the spirit of the invention as set forth in the appended claim.

I claim:

A sheet metal compartment container comprising an outer container including a body portion, end members seamed thereto, one of said end members having centrally thereof an outwardly projecting neck portion, an inner container including a body portion fitting said neck portion and extending through the outer container, a common closure member for said inner and outer containers, the body wall of said inner container, the neck portion of said outer container end and the flange of said closure common to said containers being rolled into a double seam for sealing both the inner and the outer containers and for fixedly securing said inner container to said outer container, said inner container having an inwardly projecting rib spaced from the upper end thereof and a sealed sheet metal container disposed within said inner container end held supported on said rib by the closure member common to said inner and outer containers.

FRANK J. O'BRIEN.